United States Patent [19]

Kämpf et al.

[11] Patent Number: 5,054,594

[45] Date of Patent: Oct. 8, 1991

[54] PAWL FREEWHEEL CLUTCH

[75] Inventors: Klaus Kämpf; Hubert Geisthoff, both of Lohmar, Fed. Rep. of Germany

[73] Assignee: Jean Walterscheid GmbH

[21] Appl. No.: 549,360

[22] Filed: Jul. 6, 1990

[30] Foreign Application Priority Data

Jul. 6, 1989 [DE] Fed. Rep. of Germany ....... 3922222

[51] Int. Cl.$^5$ .................. F16D 13/04; F16D 23/00
[52] U.S. Cl. ................................ 192/35; 192/46; 188/82.3
[58] Field of Search .............. 192/46, 47; 188/82.3, 188/82.34, 82.4, 82.7, 82.77

[56] References Cited

U.S. PATENT DOCUMENTS

| 2,323,353 | 7/1943 | Plog | 192/46 |
| 4,323,203 | 4/1982 | Neufeld | 188/82.3 X |
| 4,340,189 | 7/1982 | Volkert et al. | 188/82.3 X |
| 4,359,197 | 11/1982 | Neufeld | 188/82.3 X |
| 4,588,060 | 5/1986 | Norton | 192/46 X |
| 4,638,890 | 1/1987 | Lohman | 188/82.3 X |

FOREIGN PATENT DOCUMENTS 1888456 2/1964 Fed. Rep. of Germany .
1625730 2/1972 Fed. Rep. of Germany .
139154 10/1978 Fed. Rep. of Germany .
3426108 7/1985 Fed. Rep. of Germany .

Primary Examiner—Allan D. Herrmann
Assistant Examiner—Nicholas Whitelaw
Attorney, Agent, or Firm—Toren, McGeady & Associates

[57] ABSTRACT

The invention is directed to a freewheel clutch which transmits torque in two directions of rotation and controls the blocking pawls by control rings which are held back by friction rings ounter to the rotary motion and by guide extensions and pivot journals of blocking pawls guided in radial slots in guide extensions which move the blocking pawls out of or into engagement with the assigned support recesses of the inner part into a disengaged or engaged position. While, for instance, the one blocking pawl is moved into the torque transmitting position, simultaneously, the other blocking pawl is moved out of the position permitting torque transmittal. This assures a short response travel and with it a rapid switchover from the one driving direction to the other without interfering with the freewheeling motion.

17 Claims, 6 Drawing Sheets

PAWL FREEWHEEL CLUTCH

BACKGROUND OF THE INVENTION

The invention is directed to a freewheel clutch with two coupling parts, namely an inner part and an outer part, as well as blocking pawls in between both parts pivotable by means of a control mechanism. The control mechanism comprises a frictional arrangement applying braking against rotation into an engaged position and a disengaged position with respect to both rotational directions. Two sets of blocking pawls are provided which are configured to transmit torque in opposite rotational directions and to freewheel in the respective other direction of rotation, wherein all blocking pawls are pivotably supported in recesses distributed across the circumference of one clutch part and can be brought into engagement with support recesses in the other clutch part.

Such a freewheel clutch is, for instance, known from DD-PS 1 39 154, DE-GM 1 888 456 and DE 34 26 108 A1. Herein, both sets of blocking pawls are controlled in such a way that the pivoting of the pawls to be moved into the disengaged position occurs by means of a shifting spring acted upon by a frictional arrangement or by a cam disk. The engagement of the blocking pawls occurs by the force of a compression spring assigned to each blocking pawl after appropriate penetrations in the shifting spring have been opened or the cam has been moved out of engagement with the corresponding locking pawl.

Furthermore, in a freewheeling arrangement known from DE-AS 16 25 730, a blocking pawl is provided, which is designed to have two arms and is pivotably supported in the driving part. One arm of the blocking pawl serves to provide a torque transmission in one direction of rotation and the other arm serves to provide a torque transmission in the other direction of rotation.

A braking mechanism has the effect that, depending upon the driving rotational direction, the twin armed blocking pawl is pivoted into the appropriate recess. For the reversal process from one rotational direction into the other rotational direction respectively, passage through a zero position is required where the blocking pawl is not in contact with any of the butt faces provided in the outer part for torque transmission. Thus, twice the travel in circumferential direction would be covered when passing from one torque transmittal direction to the other, than would be required in order to snap into one or the other torque transmittal direction from the zero position. Furthermore, the entire torque must be directed through the journal bearing of the locking pawl. The bearing must thus be sufficiently large in order to carry these forces.

SUMMARY OF THE INVENTION

Accordingly, it is an object of the present invention to provide a free-wheel clutch designed for torque transmittal in two rotational directions, where the response travel, when switching from one rotational direction to the other, is short and where, in addition, the forces resulting from the torque transmittal do not have any effect upon the support of the blocking pawls.

Pursuant to this object, and others which will become apparent hereafter, one aspect of the present invention resides in the blocking pawls of the two sets being respectively pivotable by means of a separate control ring, and the control rings are held to be respectively relatively rotatable with respect to the coupling part where the blocking pawls are supported.

In a refinement of the invention the control rings are held to be rotatable relatively with respect to each other through a limited amount.

The advantage of this embodiment is that an introduction of the torque is directly transmitted by area abutment of the blocking pawls against the respective recesses of the two coupling parts. The pivot bearing itself is not affected by this transmittal of the forces. In addition, a shortening of the lost motions necessary for moving the blocking pawls from one torque transmittal direction into the other torque transmittal direction is achieved. While the one set of blocking pawls is moved out of the torque engagement position, simultaneously the blocking pawls of the other set are moved into the appropriate support recesses for switching into the other rotational direction. This considerably shortens the response time when reversing directions.

Another advantage of this arrangement is that the freewheeling side being the overrunning side is excited vibration-wise by the single part design of the pawls, which promotes the clutch function.

In another embodiment of the invention, a friction ring is assigned to each of the separate control rings, and the friction rings are respectively held in a receiving ring, which rings are supported to be stationary and non-rotatable or which are supported upon a coupling part so that a braking force can be applied against rotation.

In a further embodiment, the blocking elements are guided in the rotational direction by means of a frictional lock at that coupling part which comprises the support recesses. The blocking elements, in case the associated coupling part rotates faster in the same rotational sense than the coupling part supporting the blocking pawls, hold the overtaken blocking pawls in a freewheeling position, meaning in a position where they are lifted off the respective support recesses.

It is achieved by this embodiment that, in the situation where the driven coupling part runs faster than the driving coupling part, the blocking pawls acted upon by the control rings and the friction rings in the torque transmittal direction, do not rachet in the support recesses, rather they are held in a position lifted off the recesses. The otherwise typical ratcheting noise therefore does not exist here. This also diminishes the friction during the overtaking or over-running process. On the other hand, it is assured that, when the driving coupling part rotates again faster than the driven coupling part, the blocking elements do no longer engage at the blocking pawls and thus these can be moved without any hesitation into the appropriate support recesses ready for torque transmittal.

In order to achieve a precise control of the blocking pawls in all the operational situations, the control rings are equipped with a cylindrical friction surface and, facing away from the friction surface, they are equipped with radial guide extensions for the one set of associated blocking pawls, which extensions engage into appropriate guide means of the blocking pawls.

Preferably, the friction rings are designed as rotary shaft lip seals, which rest upon a friction face of the associated control ring preset by a spring.

It is proposed furthermore that the blocking pawls be equipped with a pivot journal as guide means offset radially with respect to their pivot axis and located centrally in their axial extent. The guide attachments of the control rings guide these in radial slots.

In an additional embodiment, in order to achieve a secure lifting of the blocking pawls into the over-running position out of the corresponding support recesses, a quantity of the blocking elements corresponding to half the quantity of blocking pawls are provided, which are arranged respectively in between the blocking pawls intended for torque transmittal in the opposite rotational direction and which act with their end faces upon one of the blocking pawls depending upon the rotational direction. These blocking elements are then preferably designed as circular ring segments, and are arranged in a groove of the associated coupling part and are maintained by an elastic ring in frictional lock in this groove. The frictional lock of the blocking elements with respect to the assigned clutch part permits this clutch part to overtake or overrun the driving clutch part. On the other hand, the frictional lock is sufficient in order to achieve a secure disengagement by holding the blocking pawls in a lifted-off position counter to the restoring force into the support recesses exerted by the friction and control rings.

Although a support of the blocking pawls only in the recesses is sufficient, it is provided in another embodiment of the invention, that the blocking pawls be equipped with guide journals on both ends, which are held with play in corresponding guide bearings in the coupling part in which they are supported. The guidance with tolerance or play is required in order to achieve a perfect support in the support recesses on the one hand and in the recesses in which they are supported on the other hand, without any jamming occurring.

The blocking pawls are preferably designed to be L-shaped and the edges, in which the outer faces of the legs converge, form the pivot axes which respectively rest in the tip of the associated recesses of the clutch part supporting them.

In a preferred embodiment, the outer part is that coupling part where the blocking pawls are supported in recesses. Alternately, it is however also possible that the inner part is the coupling part where the blocking pawls are supported in the recesses.

In case the outer part is the coupling part where the blocking pawls are supported, the outer part is divided and the two parts are provided with guide recesses in the parting line. The two outer parts can herein be designed to be identical and are held together by a bolt connection.

For reducing the friction, the receiving ring, where the friction rings are arranged, is supported upon the external surface of the external part with interposition of bearing bushes.

In order to guide the blocking pawls with respect to the part supporting them, retaining rings are provided as guide bearings, which are inserted into bores in the outer part overlapping the guide journals and which transgress the guide journals.

For supporting the blocking elements, the inner part is provided with a circumferential groove centrally in its axial extent, at whose side walls the blocking elements are held in contact by an elastic ring. The blocking elements respectively protrude radially out of the groove into the intermediate space between two blocking pawls arranged back to back.

The novel features which are considered as characteristic for the invention, are set forth in particular in the in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
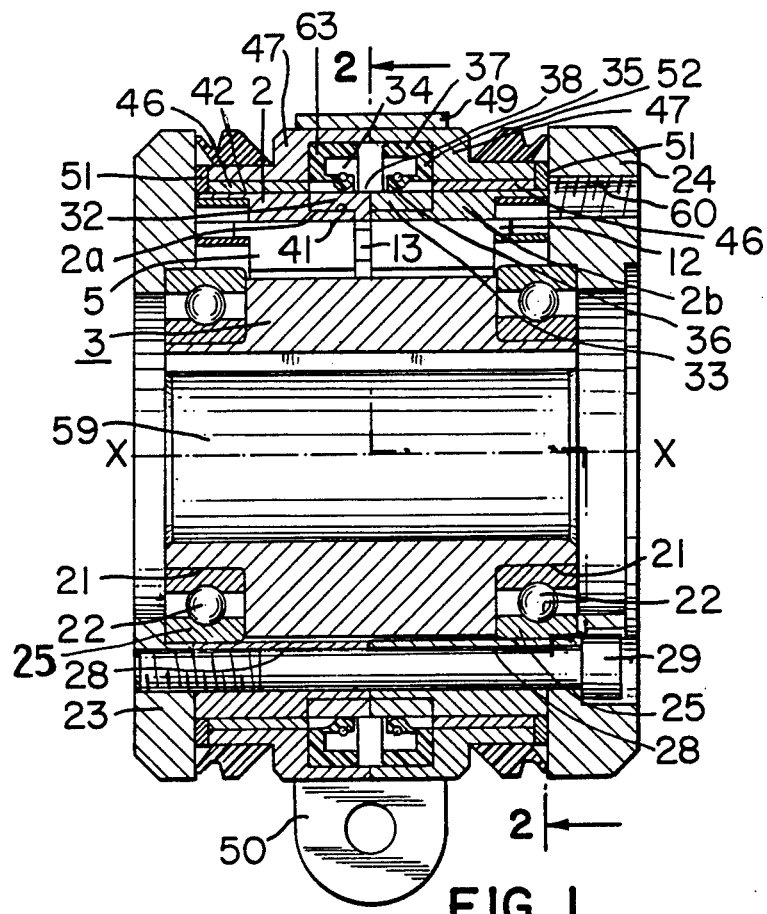
FIG. 1 is a longitudinal section through a first embodiment of a freewheeling clutch pursuant to the invention.
Figure 2:
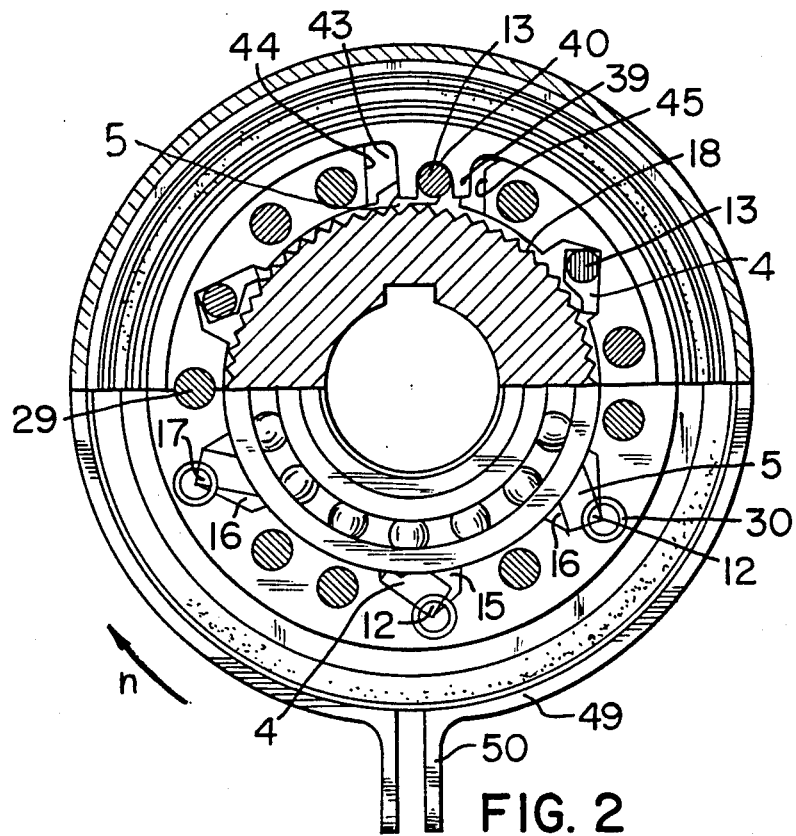
FIG. 2 is a section along 2—2 in FIG. 1'.

FIGS. 1 and 2 show a reversible freewheel clutch 1 in an assembled state.

The freewheel clutch 1 comprises essentially a divided outer part 2, whose two parts are designated by 2a or 2b, the inner part 3 arranged coaxially in the bore of the outer part 2 as well as the blocking pawls 4, 5 arranged in between. The blocking pawls 4, 5 are assigned to the outer part 2 and distributed across the circumference. They are supported respectively in recesses 15, 16 of the outer part 2. The blocking pawls 4, 5 are identical; however, they are received in opposite directions in the recesses 15, 16. Thus, three such blocking pawls form one set of blocking pawls, which are arranged in recesses 15. The blocking pawls point with their long legs and end faces in a direction n of the rotational direction arrow appearing in FIG. 2. Blocking pawls assigned to the additional set of blocking pawls 5 are arranged in the recesses 16 in such a way that they are directed counter to the first blocking pawls 4. Thus they point with their end faces counter to the rotational direction indicated by the direction of the arrow n.

The blocking pawls 4 and 5 are alternately arranged in circumferential direction in the recesses 15 or 16 and are made to be L-shaped. The long leg is designated with 7 and the short leg with 6. The outer faces 8, 9 of the two legs 6, 7 converge in the edge 11, which also forms the cutting edge, which is provided for support in the tip 17 of the recesses 15, 16. The blocking pawls 4, 5 are provided with guide journals 12 on the ends in the region of the short leg 6, which journals are shaped as quarter circles in cross-section. These quarter circles are received in corresponding retaining rings 30. The retaining rings 30 are inserted into bores 31 of the outer part 2. Herein, the bore 31 for the retaining rings 30 is arranged in such a way that it crosses over the guide journals 12, so that the retaining rings 30 can be pushed over the guide journals 12. The retaining rings 30 embrace the guide journals 12 with play, so that the blocking pawls 4, 5 can adjust themselves in the appropriate recess 15 or 16 without any constraints arising, and can be brought with their pivot axis 11 into contact with the tip 17 of the recess 15, 16 or can abut without any constraints at corresponding abutment faces of the recesses 15, 16 in order to be able to transmit torque. The abutment of the blocking pawls 4, 5 is achieved by the outer face 8 of the short leg 6 relative to the outer part 2 and by the end face 10 in the support recesses 18 which are designed to be sawtooth-shaped and extend to be distributed across the circumference of the inner part 3. This can be discerned particularly from FIGS. 13 and 14, where the inner part 3 is shown as an individual part. The support recesses 18 comprise, respectively, two support faces 19 and 20 at which the blocking pawls 4, 5 come to rest. In the embodiment example in FIGS. 1 and 2, the blocking pawl 4 for instance comes into contact respectively with the support faces 19, while the blocking pawls 5 come into contact at the support surfaces 20. Herein a torque transmittal in the direction of the arrow n is achieved for the blocking pawls 4, while the blocking pawls 5 achieve a torque transmittal counter to the direction of the arrow n.

Figure 13:
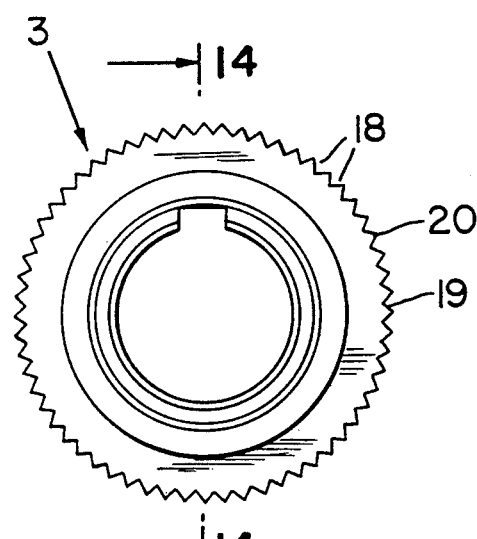
FIG. 13 is a side view of an inner part.
Figure 14:
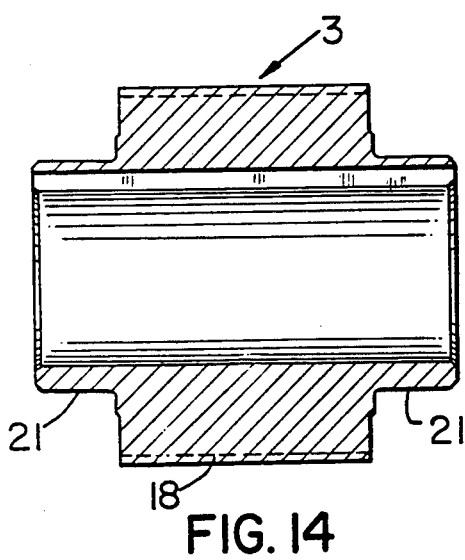
FIG. 14 is a longitudinal section through the inner part in FIG. 13.
Figure 15:
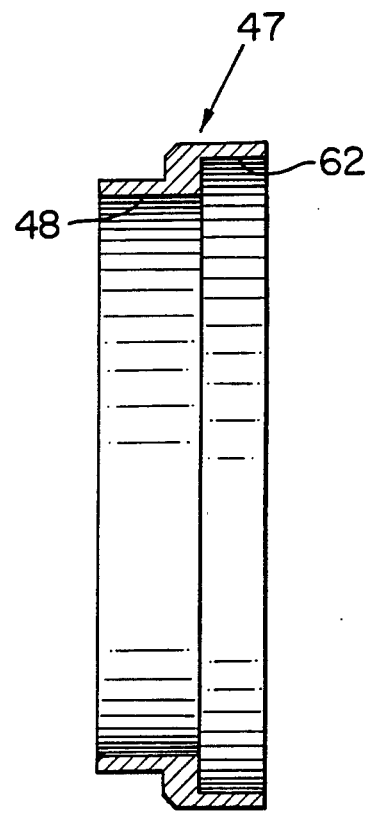
FIG. 15 is an axial section through a receiving ring.

It can be discerned from FIGS. 1, 13 and 14 that the inner part 3 is supported in the outer part 2 on ball bearings 22. The ball bearings 22 are retained in bearing seats 21 of the inner part 3 as well as bearing bores 25 in the outer part 2. They extend additionally into two covers 23 and 24. The cover appearing in FIG. 1 on the left-hand side is designated with the numeral 23 and the other cover with the numeral 24.

Figure 10:
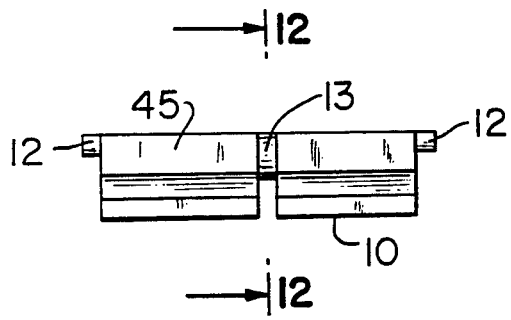
FIG. 10 is a front view of a blocking pawl.
Figure 11:
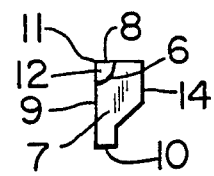
FIG. 11 is a side view of FIG. 10.
Figure 12:
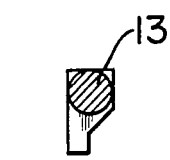
FIG. 12 is a section 12—12 in FIG. 10.

Control rings 32, 33 are provided for guidance of the blocking pawls, meaning for synchronization of the motion of the blocking pawls 4 and 5 which respectively belong to one set. These control rings cooperate with pivot journals 13 of the blocking pawls 4, 5, which pivot journals 13 are fastened centrally in the axial extent of the blocking pawls 4, 5. The design of the pivot journals 13 can be especially gathered from FIGS. 10 and 12. It can been seen, that the pivot journal 13 is offset towards the pivot axis 11. The blocking pawls 5 or 4 belonging respectively to one set are synchronized respectively by one control ring 32 or 33. Thus, the blocking pawls 5 are synchronized by the control ring 32 and the blocking pawls 4 by the control ring 33 as far as their motion is concerned.

The two control rings are arranged in a groove 41 in the outer part 2. The groove 41 is located respectively in part in outer parts 2a and 2b. The two control rings 32, 33 comprise a cylindrically extending segment, which is provided externally with a cylindrical frictional surface 38. Facing away from the frictional surface 38 there extend guide attachments 39 in the radial direction, and in this embodiment radially inward, which attachments are provided with radial slots 40. The guide attachments 39 are distributed circumferentially corresponding to the arrangement of the blocking pawls 4, 5 for the guidance of which they serve. The radial slots 40 of the guide attachments 39 serve for embracing the pivot journals 13 of the respective blocking pawls 4, 5.

Figure 7:
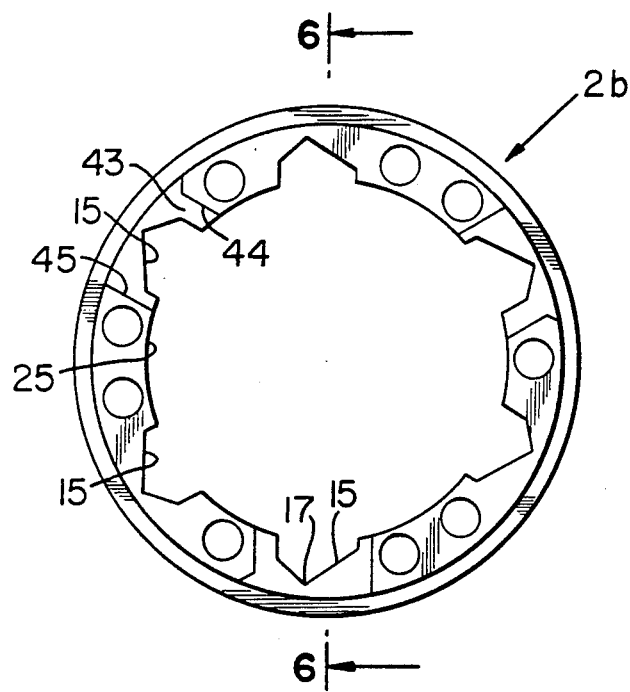
FIG. 7 is a side view of FIG. 6.
Figure 8:
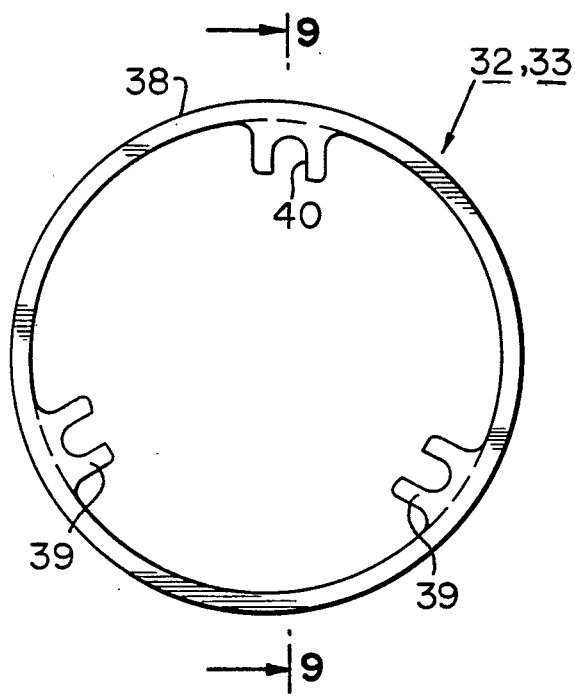
FIG. 8 is a front view of a control ring.
Figure 9:
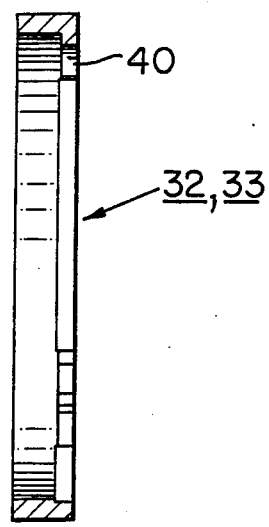
FIG. 9 is a side view of FIG. 8, in section.

The two control rings 32, 33 are arranged in such a way that they face each other with the region containing the guide attachment 39. The outer part 2 is designed to be divided so that the control rings discernible as individual parts in FIGS. 8 and 9 can protrude radially with their guide attachment 39 into the region of the pivot journals 13 of the blocking pawls 4 or 5. The two parts of the outer part can be discerned from FIGS. 3 to 7. Thus, the outer part 2a shown in FIG. 1 on the left-hand side can be discerned in FIGS. 3 to 5 and the other part 2b shown on the right-hand side in FIG. 1 can be seen in FIGS. 6 and 7. The two outer parts 2a and 2b are themselves identical. However, they will be referred to individually in order to better explain their function.

Figure 3:
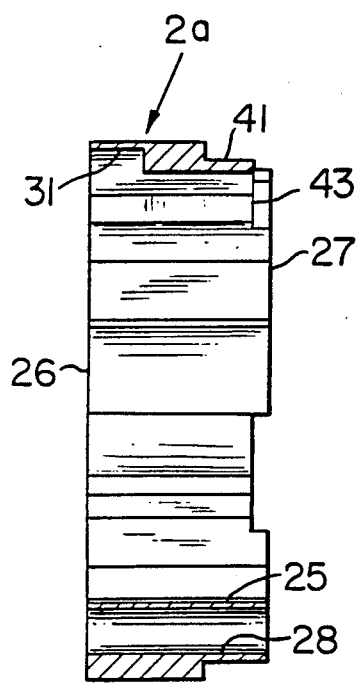
FIG. 3 is a longitudinal section 3—3 through the first coupling outer part in FIG. 4.
Figure 4:
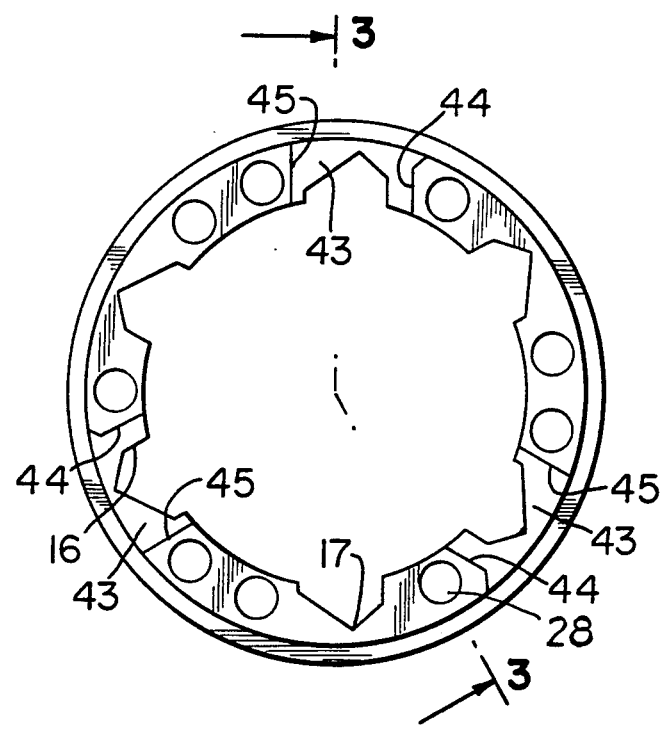
FIG. 4 is a side view of FIG. 3.
Figure 5:
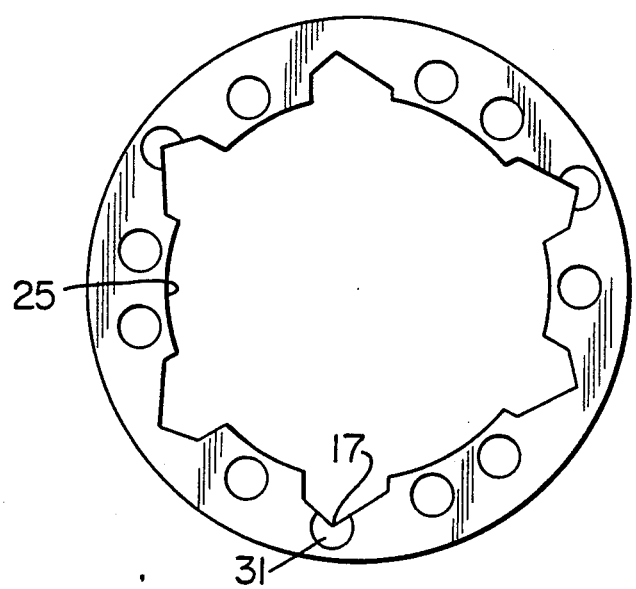
FIG. 5 is a further side view of FIG. 3.
Figure 6:
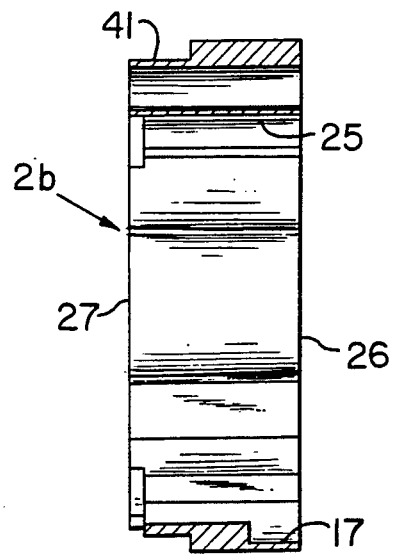
FIG. 6 is a second coupling outer part in section.

It can be discerned in the outer part 2b depicted in FIGS. 3 to 5, that recesses 15 and 16 are alternately provided, which serve respectively for receiving the blocking pawls 4 or 5. The recesses 15, 16 are essentially triangular. Their tip 17 forms the support for the edge of the blocking pawls 4, 5 which edge represents the pivot axis 11. The parting surface, this is the right-hand face towards the outer part 2a corresponding to FIG. 3, is designated by 27, while in the outer part 2b the left face in FIG. 6 represents the parting surface and is also designated with the numeral 27. It can be seen that the two outer parts 2a and 2b comprise complementary turned out grooves, which together form the groove 41 for receiving the two control rings 32, 33. The two outer parts 2a and 2b are held with their parting surfaces 27 in contact in the assembled position shown in FIG. 1. Guide recesses 43 are provided for passage of the guide extensions 39 associated with the control ring 32, 33 radially inward into the region of the pivot journals 13 of the blocking pawls 4, 5. The guide recesses 43 belong respectively to the recesses 15 or 16. It is seen in FIG. 4, that in the outer portion 2a, to which the guide ring 32 is assigned and which serves for controlling the blocking pawls 5, the guide recesses 43 cover the blocking pawls 5 in the recesses 16 in which said blocking pawls are arranged. The guide recesses 43 are bounded on the sides by boundary surfaces 44, 45, which are arranged in such a way that sufficient freedom of movement space for the associated blocking pawls 5 exists from the engagement into the disengagement position with respect to the inner part 3. In the normal situation however the guide extensions will not come into contact.

It is seen in FIG. 4 that three such guide recesses 43 are provided. The other outer portion 2b depicted in FIGS. 6 and 7 comprises three guide recesses 43 distributed across the circumference, which are assigned to the recesses 15. These guide recesses 43 serve for the passage of the guide attachments 39 of the control ring 33, which synchronizes the movement of the blocking pawls 4.

The two outer parts 2a, 2b are provided with communicating bores 28 which extend into the bearing cover 23, 24. The bearing cover 23 has a threaded bore, while the mounting cover 24 is provided with an immersed bore, in which the connecting bolts 29 are received with a bolt head, while they are threaded with a threaded end into the bores in the cover 23.

The covers 23, 24 and the bolts 29 not only fasten the inner part 3 and the two parts 2a, 2b forming the outer part 2, they also hold together the frictional arrangement which controls the control rings 32, 33. The friction rings 34, 35 are supported upon the outer surface 42 of the outer part 2 with interposition of bearing bushes 46 and receiving rings 47. The bearing bushes 46 are secured axially by guide rings 51 in the region of the contact faces 26 of the two outer parts 2a, 2b at which the covers 23, 24 rest. The bearing bushes 46 are retained in a bore 48 of the two receiving rings 47. Each of the two receiving rings 47 comprises a turned-in groove 63 which receives one friction ring 34 or 35. The friction ring 34 cooperates by means of its contact surface 36 with a frictional surface 38 of the control ring 32. The friction ring 34 is retained with its outer surface 37 in the turned-in groove 63 of the receiving ring 47 so as to be locked rotationally with respect thereto. The friction ring 35 contacts with its contact face 36 the frictional face 38 of the control ring 33. The frictional ring 35 is assigned to the other receiving ring 47 which is also inserted non-rotatably with its outer surface 37 into the turned groove 63. The two receiving rings 47 are arranged opposite each other in such a way upon the outer surface 42 of outer part 2 that their turned grooves 63 form a chamber for receiving the two friction rings 34, 35. The two receiving rings 47 are surrounded by a clamping ring 49 provided with attachment lugs 50, by means of which the receiving rings 47 and due to these also the friction rings 34 can be held to be stationary with respect to the rotating outer part 2.

If the outer part 2 is rotated in the rotational direction n in FIG. 2, around the axis of rotation X—X of the freewheel clutch 1, the frictional lock between the friction ring 35 with the friction face 38 of the control ring 33 causes a holding back of the control ring 33 with respect to the rotary motion of the outer part 2, so that because of the articulation of the blocking pawls 4, these are pivoted out of the disengaged position shown in FIG. 2 inward into the engaged position, so that their end faces 10 come to rest on the face 19 of the support recess 18 of the inner part 3. Simultaneously, the control ring 32 is held back with respect to the rotary motion in the rotational direction n because of the frictional lock between the friction ring 34 and the control ring 32. However, because of the arrangement of the blocking pawl 5 oriented counter to the blocking pawl 4, there occurs a disengagement of the blocking pawl 5 with its end position 10 out of contact with the support surface 20 of the support recess 18.

The blocking pawl 5 is then moved out of the engaged position shown in FIG. 2 into the position occupied by the blocking pawl 4 in the diagram in FIG. 2. Thus, it recedes radially from the control recesses 18 in the inner part 3. Therefore, a relative motion between the control rings 32, 33 in the respective guide recesses 43 with respect to the outer parts 2a, 2b occurs, wherein they respectively approach one of the boundary faces 44, 45 of the outer parts 2a, 2b without, however, coming to rest at these.

Pivoting of the blocking pawls 4, 5 occurs respectively around the pivot axis 11 with assist from the pivoting moment exerted by the control rings 32 or 33 upon the journals 13 of the blocking pawls 5 or 4.

An overtaking or overrunning or freewheeling by the inner part 3 can occur also counter to the direction n in the position shown in FIG. 2, meaning when a torque transmittal counter to the rotational direction n occurs by means of the pawls 5 from the outer part 2 to the inner part 3. Herein the blocking pawls 5 slide at the support faces of the support recess 18 radially outwardly counter to the displacement force exerted by the friction ring 34 for movement into the engaged position. The frictional lock permits also a reset, meaning a relative motion of the control ring 32 with respect to the friction ring 34 for backward rotation or return rotation of the blocking pawls 5. If a state again is reached where the outer part 2 attains the rpm of the inner part 3 counter to the direction of rotation n or exceeds same, there occurs again automatically an engagement of the locking pawls 5 into the position shown in FIG. 2 and an entrainment of the inner part 3 by the outer part 2. For mounting on a driving or driven component, the freewheel clutch 1 is provided with threaded bores 26 in the region of the mounting cover 24. The inner part 3 can be connected by means of a shaft insertable into the mounting bore 59, for instance, with the part to be driven.

Figure 16:
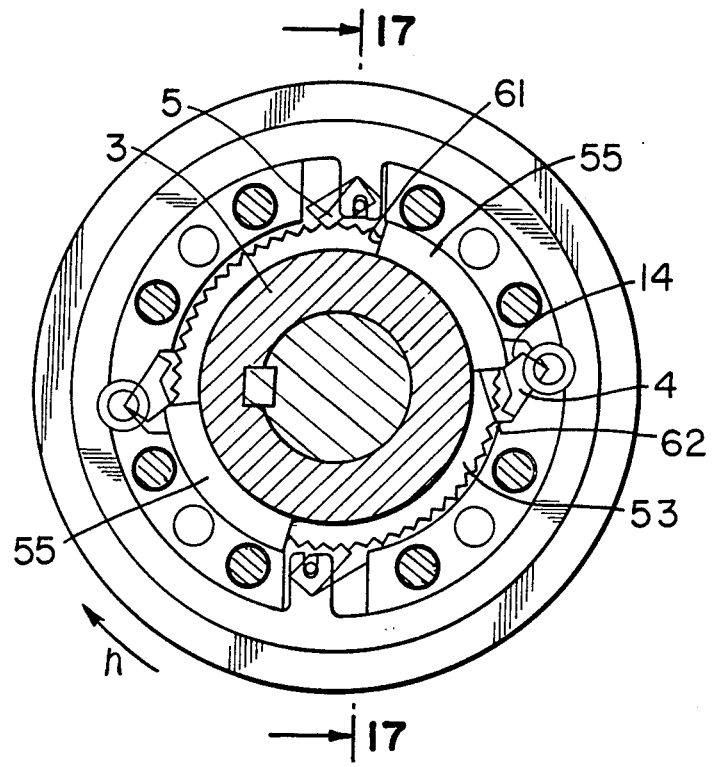
FIG. 16 is a section 16—16 through a further embodiment of a freewheeling clutch in FIG. 17.
Figure 17:
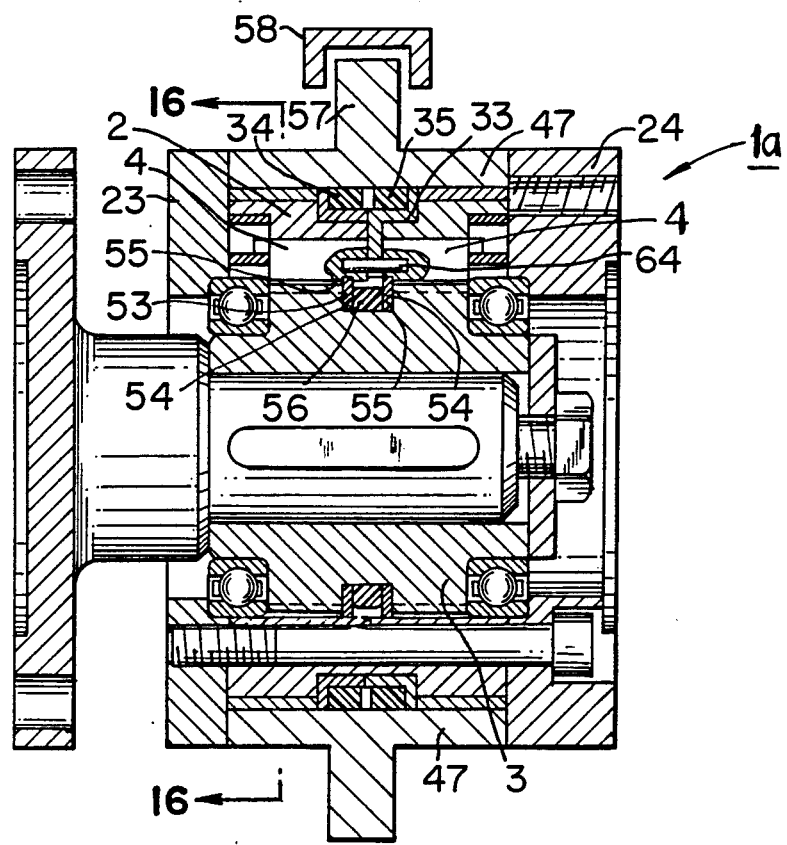
FIG. 17 is a longitudinal section through the freewheel clutch in FIG. 16.

So as to prevent a ratcheting of the blocking pawls 4 or 5 upon the outer surface of the inner part 3 in the freewheeling position, meaning when the inner part 3 rotates faster than the outer part 2, respectively provided for the driving function, since said blocking pawls are acted upon because of the friction rings depending upon the rotational direction in direction of the radial motion into the support recess, an arrangement of blocking elements has been configured in a refinement of the solution described in FIGS. 16 and 17. In between two blocking pawls 4 and 5, respectively arranged in opposite directions, blocking elements 55 are located in a groove 53 of the inner part 3. The groove 53 is located approximately in the middle of the region of the parting surface 27 of the outer part 2. The blocking elements 55 are designed to be shaped as quarter circles. Respectively two blocking elements are provided for acting on two blocking pawls 4, 5 follow each other but point in opposite directions.

Between the blocking elements 55, an elastic ring 56 is inserted with prestress, so that the blocking elements 55 are pressed against the side walls 54 of the groove 53 and are kept in frictional lock or frictional engagement. Radially, the blocking elements 55 project so far from the groove 53 of the inner part 3 that they protrude into the region of the blocking pawls 4, 5. The blocking pawls 4, 5 have faces 14 against which end faces 61 of the blocking elements 55 come to rest. In case the inner part 3 rotates faster in the rotational direction n in FIG. 16 than the outer part 2, the blocking elements 55 are carried along in the rotational direction n due to frictional engagement and run up against the butt face 14 of the blocking pawl 4, and lift the locking pawl, counter to the frictional force exerted upon the blocking pawls 4 by the friction ring 35 and the control ring 33, out of the associated support recess 18 of the inner part 3. When the outer part 2 is overtaken by the inner part 3 in a rotational direction counter to the rotational direction n, the end face 21 of the blocking element 55 comes into contact with the butt face 14 of the other blocking pawl 5. In the version shown in FIGS. 16 and 17, four blocking pawls are provided overall, with respectively two blocking pawls 4 and two blocking pawls 5 in each rotational direction. Correspondingly, a quantity of blocking elements corresponding to half the quantity of blocking pawls 4, 5, thus two pairs of blocking elements 55, are provided.

Apart from the friction ring control explained in connection with the embodiments of FIGS. 1 to 15, where the receiving rings and with them the friction rings 34, 35 are permanently retained to be stationary, meaning non-rotatably because of the clamping ring 49, there can also be one braking disc 57 assigned to the single receiving ring 47 as can be seen from FIGS. 16 and 17. The brake disc 57 can be acted upon selectively by a braking force by means of a brake shoe 58. It is, however, also conceivable that the brake arrangement comprising the brake disc 57 and the brake shoe 58 is configured as an electromagnetic brake. If we are dealing with an externally actuatable brake, it is possible, if effectively a switching process is desired, that a braking moment can be exerted upon the brake disc 57 upon change of rotational direction.

Apart from the above, the freewheel clutch 1a corresponds essentially to the version in FIGS. 1 and 2. Only the friction rings 34, 35 are in this case designed as rings with a quadratic cross-section In addition, the blocking pawls 4 or 5 are constructed to be divided, and their two individual parts are connected with each other by a socket pin 64.

Figure 18:
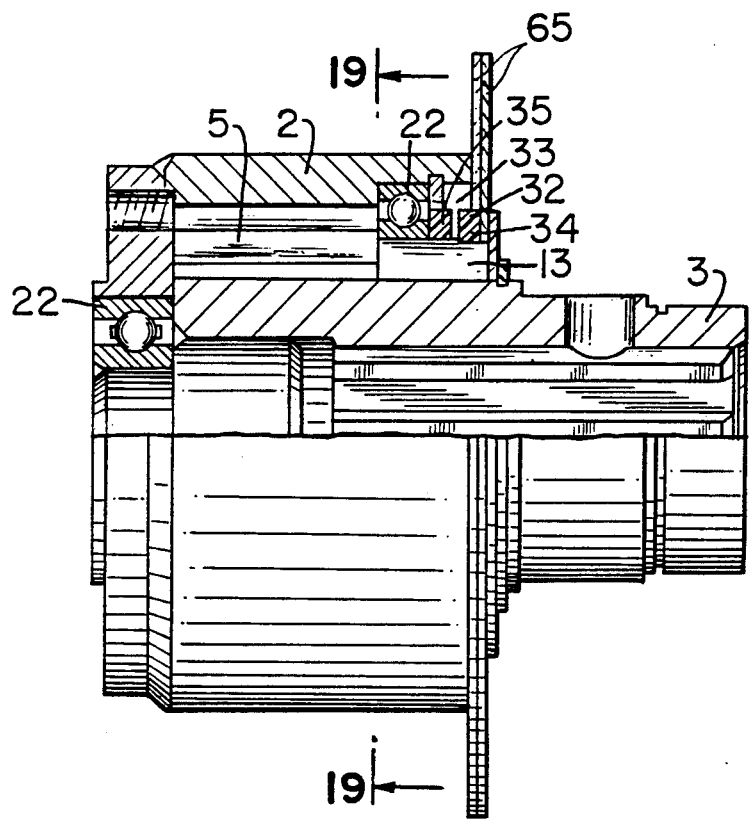
FIG. 18 is a longitudinal section through a third alternative of a freewheel clutch, where the blocking pawls are assigned to the inner part.
Figure 19:
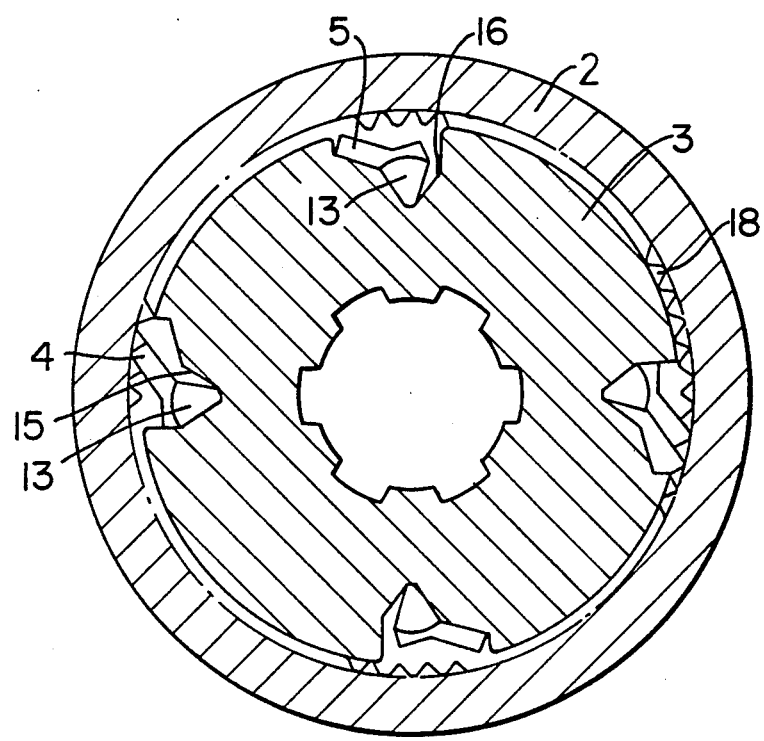
FIG. 19 is a side view of FIG. 18 in section along the line I—I.

The blocking pawls 4, 5 are assigned to the inner part 38 in the version shown in FIGS. 18 and 19. This means that the recesses 15 and 16 supporting same are located in the inner part 3, while the support recesses 18 are located in the outer part 2. In this case, the inner part 3 is the respectively driving part, while the outer part 2 is driven. The friction rings 34, 35 act correspondingly upon the inner part 3 and the control rings 32, 33 assigned to the inner part 3.

The outer part 2 and the inner part 3 are supported opposite each other by means of ball bearings 22. In this embodiment, the guide means 13 are not arranged in the middle region of the blocking pawls 4, 5; rather, they extend proceeding from one end face of the blocking pawls 4, 5. The arc-shaped design of the outer contour of the guide means 13 discernible from FIG. 19, serves as a contact face for the friction rings 34 or 35. The arc-shaped guide faces of the guide means 13 which pertain to the blocking pawls 4, have a larger diameter than the guide faces of the guide means 13 which pertain to the blocking pawls 5. For the rest of it, the guide means 13 constructed as extensions which are assigned to the blocking pawls 5 are constructed to be longer axially than the guide means pertaining to the blocking pawls 4. Both control rings 32, 33 have flanges 65 directed outward, which are held to be stationary, meaning nonrotatably, or however they can be held to be influenced by a brake.

While the invention has been illustrated and described as embodied in a freewheel clutch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A freewheel clutch, comprising:
   two coupling parts, namely an inner part and an outer part; and
   blocking pawls in between both coupling parts pivotable by means of a control mechanism having a friction arrangement for braking against rotation, the pawls being pivotable into an engaged position and a disengaged position with respect to both rotational directions, a first set and a second set of blocking pawls being provided, which are configured to transmit torque in opposite rotational directions and freewheel in a respective other direction of rotation, all the blocking pawls being pivotably supported in recessed distributed across the circumference of one coupling part and engageable into support recesses in the other coupling part, the blocking pawls (4, 5) of the first est and the second set being respectively pivotable by separate control rings (32, 33), which control rings (32, 33) are held respectively to be rotatable relative to the coupling part (2) which supports the blocking pawls (4, 5).

2. A freewheel clutch according to claim 1, wherein the control rings (32, 33) are respectively relatively rotatable to a limited extent.

3. A freewheel clutch according to claim 1, wherein a friction ring (34, 35) is assigned to each separate control ring (32, 33), and the friction rings (34, 35) are respectively retained in a receiving ring (47), which is supported on a coupling part (2) so as to be non-rotatable stationary or so as to be brakeable against rotation.

4. A freewheel clutch according to claim 1, and further comprising blocking elements (55) which are guidable in a rotational direction by frictional lock at an associated coupling part (3) which has the support recesses (18), so that if the associated coupling part (3) rotates faster in a common rotational direction than the coupling part (2) supporting the blocking pawls (4), the overrun locking pawls (4, 5) are held in a freewheel position in which they are lifted out of the support recesses (18).

5. A freewheel clutch according to claim 1, wherein the control rings (32, 33) are provided with a cylindrical friction surface (38) and, facing away from the friction surface (38), are provided for blocking pawls (4, 5) forming part of one set, with radial guide extensions (39) which engage with corresponding guide means (13) of the locking pawls (4, 5).

6. A freewheel clutch according to claim 5, wherein the friction arrangement includes friction rings (34, 35) which are rotary shaft lip seals and which rest upon the friction surface (38) of an associated control ring (32, 33) prestressed by a spring (37).

7. A freewheel clutch according to claim 5, wherein the blocking pawls (4, 5) have a pivot axis (11), and are provided with a pivot journal (13) radially offset with respect to the pivot axis (11) which forms a guide means centrally within the axial extent of the pawls, the guide extensions (39) of the control rings (32, 33) guide the journals (13) in radial slots (40).

8. A freewheel clutch according to claim 4, wherein a number of blocking elements (55) corresponding to half the number of blocking pawls (4, 5) is provided, which blocking elements are respectively arranged in between two blocking pawls (4, 5) provided for torque transmittal in opposite rotational directions, the blocking elements having end faces (61, 62) which act upon one of the blocking pawls (4, 5) depending upon the rotational direction.

9. A freewheel clutch according to claim 4, wherein the blocking elements (55) are configured as circular ring segments and are arranged in a groove (53) of the associated coupling part (3) and are frictionally locked in the groove (53) by an elastic ring (56).

10. A freewheel clutch according to claim 1, wherein the coupling part (2) has guide bearings (30), the blocking pawls (4, 5) being equipped on both ends with guide journals (12) which are held with play in corresponding of the guide bearings (30) of the coupling part (2) supporting them.

11. A freewheel clutch according to claim 1, wherein the blocking pawls (4, 5) are L-shaped and have legs (6, 7) with outer surfaces (8, 9) having edges which converge to form a pivot axis (11), which edges respectively rest in a tip (17) of an associated recess (15, 16).

12. A freewheel clutch according to claim 1, wherein the coupling part in which the blocking pawls (4, 5) are supported in recesses (15, 16) is the outer coupling part (2).

13. A freewheel clutch according to claim 1, wherein the coupling part in which the blocking pawls (4, 5) are supported in recesses (15, 16) is the inner coupling part (3).

14. A freewheel clutch according to claim 12, wherein the outer part (2) is radially divided into two parts (2a, 2b) which are provided with guide recesses (43) in a plane (27) dividing the two parts.

15. A freewheel clutch according to claim 3, wherein the coupling part in which the blocking pawls (4, 5) are supported in recesses (15, 16) is the outer coupling part (2), the receiving ring (47) being supported upon the outer surface (42) of the outer part (2) with interposition of bearing bushes (46).

16. A freewheel clutch according to claim 10, wherein the coupling part in which the blocking pawls (4, 5) are supported in recesses (15, 16) is the outer coupling part (2), and further comprising retaining rings (30) provided as guide bearings, which are inserted into bores (31) of the outer part (2) overlapping the guide journals (12) and extending beyond the guide journals (12).

17. A freewheel clutch according to claim 9, wherein the coupling part in which the blocking pawls (4, 5) are supported in recesses (15, 16) is the outer coupling part (2), the coupling part (3) is an inner part (3) which is provided with a circumferential groove (53) centrally of its axial extent, against whose side walls the blocking elements (55) are held in contact by the elastic ring (56) so that the blocking elements (55) protrude respectively radially out of the groove (53) and into an intermediate space of two oppositely arranged blocking pawls (4, 5).

* * * * *

UNITED STATES PATENT AND TRADEMARK OFFICE
CERTIFICATE OF CORRECTION

PATENT NO. : 5,054,594

DATED : October 8, 1991

INVENTOR(S) : Klaus Kampf and Hubert Geisthoff

It is certified that error appears in the above-identified patent and that said Letters Patent is hereby corrected as shown below:

On Title Page item

[73] Assignee: Jean Walterscheid GmbH
Federal Republic of Germany

Signed and Sealed this

Ninth Day of March, 1993

Attest:

STEPHEN G. KUNIN

Attesting Officer    Acting Commissioner of Patents and Trademarks